(12) United States Patent
Boersma et al.

(10) Patent No.: US 8,949,575 B2
(45) Date of Patent: Feb. 3, 2015

(54) REVERSING PROCESSING ORDER IN HALF-PUMPED SIMD EXECUTION UNITS TO ACHIEVE K CYCLE ISSUE-TO-ISSUE LATENCY

(75) Inventors: Maarten J. Boersma, Holzgerlingen (DE); Markus Kaltenbach, Leinfelden (DE); Christophe J. Layer, Boeblingen (DE); Jens Leenstra, Bondorf (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 13/326,249

(22) Filed: Dec. 14, 2011

(65) Prior Publication Data

US 2013/0159666 A1 Jun. 20, 2013

(51) Int. Cl.
 *G06F 9/38* (2006.01)
 *G06F 9/30* (2006.01)
 *G06F 15/80* (2006.01)

(52) U.S. Cl.
 CPC ........ *G06F 9/30036* (2013.01); *G06F 15/8053* (2013.01)
 USPC .............................................. 712/7; 712/229

(58) Field of Classification Search
 CPC .......................... G06F 9/30036; G06F 15/8053
 USPC ..................................................... 712/7, 229
 See application file for complete search history.

(56) References Cited

U.S. PATENT DOCUMENTS

| 4,939,638 | A | 7/1990 | Stephenson et al. |
| 5,261,063 | A | 11/1993 | Kohn et al. |
| 5,418,915 | A | 5/1995 | Matuda et al. |
| 5,768,575 | A * | 6/1998 | McFarland et al. ........... 712/228 |
| 6,266,758 | B1 | 7/2001 | van Hook et al. |
| 6,295,599 | B1 | 9/2001 | Hansen et al. |
| 6,401,194 | B1 | 6/2002 | Nguyen et al. |
| 6,839,828 | B2 | 1/2005 | Gschwind et al. |
| 7,366,881 | B2 | 4/2008 | Roussel et al. |
| 2002/0184474 | A1 | 12/2002 | Roussel et al. |
| 2004/0193838 | A1 | 9/2004 | Devaney et al. |

(Continued)

OTHER PUBLICATIONS

Eisen, L et al., "IBM POWER6 accelerators: VMX and DFU", IBM Journal of Research and Development, vol. 51, No. 6 Nov. 2007, pp. 663-683.

(Continued)

*Primary Examiner* — Keith Vicary
*Assistant Examiner* — Jyoti Mehta
(74) *Attorney, Agent, or Firm* — DeLizio Gilliam, PLLC

(57) ABSTRACT

Techniques for reducing issue-to-issue latency by reversing processing order in half-pumped single instruction multiple data (SIMD) execution units are described. In one embodiment a processor functional unit is provided comprising a frontend unit, and execution core unit, a backend unit, an execution order control signal unit, a first interconnect coupled between and output and an input of the execution core unit and a second interconnect coupled between an output of the backend unit and an input of the frontend unit. In operation, the execution order control signal unit generates a forwarding order control signal based on the parity of an applied clock signal on reception of a first vector instruction. This control signal is in turn used to selectively forward first and second portions of an execution result of the first vector instruction via the interconnects for use in the execution of a dependent second vector instruction.

10 Claims, 11 Drawing Sheets

(56) References Cited

U.S. PATENT DOCUMENTS

2010/0122067 A1     5/2010    Lindholm et al.
2014/0075153 A1     3/2014    Boersma et al.

OTHER PUBLICATIONS

Forsyth, Tom, "SIMD Programming with Larrabee", Larrabee Architect http://www.stanford.edu/class/ee380/Abstracts/100106-slides.pdf (Obtained from the Internet on May 10, 2011) No Publication Date Found, 80 pages.

Jarp, Sverre, "How to harness the performance potential of current Multi-Core CPUs and GPUs", CHEP 10 Oct. 18, 2010, 42 pages.

Le, Thuy T. et al., "Advances in Parallel Computing for the Year 2000 and Beyond", Second Annual VACETS Technical International Conference, Jul. 17-19, 1997 San Jose State University, San Jose, California Jul. 17-19, 1997, 9 pages.

Le, H. Q. et al., "IBM POWER6 microarchitecture", IBM Journal of Research and Development, vol. 51, No. 6 Nov. 2007, pp. 639-662.

Mueller, Silvia M. et al., "The Vector Floating-Point Unit in a Synergistic Processor Element of a CELL Processor", Proc. 17th IEEE Symposium on Computer Arithmetic http://ieeexplore.ieee.org/stamp/stamp.jsp?arnumber=1467623 (Obtained from the Internet on May 10, 2011) Jun. 27-29, 2005, pp. 59-67.

Parcerisa, Joan-Manuel et al., "Improving Latency Tolerance of Multithreading through Decoupling", IEEE Transactions on Computers vol. 50 Issue Oct. 10, 2001, 25 pages.

* cited by examiner

US 8,949,575 B2

REVERSING PROCESSING ORDER IN HALF-PUMPED SIMD EXECUTION UNITS TO ACHIEVE K CYCLE ISSUE-TO-ISSUE LATENCY

BACKGROUND

Embodiments of the inventive subject matter generally relate to the field of system and processor architecture, and, more particularly, to reducing instruction issuance latency.

Conventional data processing systems ranging from mobile and embedded devices to super computers typically include one or more processing elements (e.g., central processing units, graphics processing units, co-processors or the like) frequently embodied within one or more integrated circuits for the purpose of processing data resident within one or more elements of a data storage hierarchy. The majority of such processing elements are designed to operate in a pipelined fashion, whereby data processing is broken down into a series of steps or "stages" with associated logic elements separated by storage buffers or registers typically implemented with "flip-flop" or "latch" circuits. Advancement of instructions through the pipeline is typically controlled or synchronized via the application of a clock signal to all components of the processing element.

Pipelining typically yields a number of advantages over similar non-pipelined architectures. As multiple pipeline stages can operate substantially simultaneously, integrated circuit logic is used more efficiently than in non-pipelined architectures were functional units or logic elements may sit idle. Consequently, overall instruction throughput in terms of the number of instructions performed per unit time is typically increased. Many pipelined processing elements are capable of issuing or completing at least one instruction per clock cycle and such systems are said to be "fully pipelined".

While pipelining increases instruction throughput, it does not decrease, but rather actually typically slightly increases, the execution time of an individual instruction. Conventional pipelined processor designs therefore typically suffer from a number of known drawbacks. Most of the drawbacks associated with pipelined processors are due to the potential for hazards to occur which prevent subsequent instructions from advancing in the pipeline and completing execution during their associated pipeline slots or clock cycles. Hazards fall into three classes, structural, control, and data. Structural hazards arise from resource conflicts when system hardware cannot support all possible combinations of instructions in overlapped execution. Control hazards arise from pipelining of branches and other instructions that change the processor program counter (PC). Data hazards arise when an instruction depends on the results of a previously instruction in a way that is exposed by the overlapping of instructions in the pipeline.

One technique used to address data hazards in modern processors without "stalling" instruction processing is the use of result forwarding. In result forwarding, instruction processing (e.g., execution) results are rerouted prior to reaching a final pipeline stage to be used in the processing of a subsequent instruction. FIG. 1 illustrates a processing element including early result forwarding according to the prior art.

In the processing element of FIG. 1, data of each of two separate instruction operands is retrieved or applied from a register file (not shown) to each of two corresponding multiplexers (110A and 110B). In the embodiment of FIG. 1, the illustrated processing element is capable of processing operands and generating results having a data width of 2N where N is a positive integer value. Operands received and selected utilizing multiplexers 110 are applied to corresponding unpack_2N blocks 112a and 112b which convert the received data from a 2N-bit wide bit external or "interface" format into an internal format, utilized in operand processing by an associated execution unit such as execution unit 116.

Once converted, internal format operands are stored in corresponding operand registers 114 as shown. In the depicted processing element of FIG. 1, operand registers 114A and 114B are implemented as multiplexer (MUX) latches capable of both storing operands to be processed as well as to select between unpack block unit inputs and forwarded results inputs further described herein. A corresponding pack_2N block 118 converts the execution result data from an internal format back into the 2N-bit wide interface format. Interface format results generated by execution unit 116 may then be stored in a result register 120 from which the result, upon selection utilizing a global result multiplexer 122, may be reapplied to the register file as instruction processing completes and/or applied to the operand registers of the same or another processing element as shown.

In the processing element of FIG. 1, early forwarding support is provided via buses 124 or 126 as shown. Results produced by execution unit 116 may be provided from an output of the execution unit to operand registers 114A and 114B in internal format via bus B 124 as will be described in further detail with respect to FIG. 2, or alternatively in a 2N bit wide interface format from result register 120 to multiplexers 110A and 110B via bus A 126 as will be described in further detail with respect to FIG. 3. It should be noted that bus B 124 as depicted in FIG. 1 is private to execution unit 116, whereas bus A 126 is shared among a plurality of execution units having access to a common register file. Consequently, bus A 126 carries each execution result only in the cycle in which the result is to be sent to the register file and bus R cannot be guaranteed to be selected via global result multiplexer 122 in other cycles. FIG. 2 illustrates a timing diagram depicting early result forwarding via an internal operand format bus according to the prior art.

In the timing diagram of FIG. 2, a processing element clock cycle at which operands of a given instruction are available at inputs of operand registers 114A and 114B is referred to as cycle "RF". Based on the overall pipeline depth and the number of logic levels of an associated processing element, a processing result is available on bus R, denoting an output of result register 120, K cycles after RF, where K is a positive integer value representing the number of pipeline stages of the processing element as a whole. The timing diagram of FIG. 2 depicts the processing of two successive instructions, INSTR 1 and INSTR 2, where the INSTR 2 instruction depends on an execution result of INSTR 1.

At an initial clock cycle RF, indicated by the left-most timing interval, operands of INSTR 1 are available at inputs of operand registers 114A and 114B. At an immediately subsequent clock signal cycle (RF+1) INSTR 1's operands enter a first pipeline stage of execution unit 116. INSTR 1 executes in a pipelined fashion and subsequently at clock signal cycle RF+K−1, completes execution to generate an intermediary (i.e., internal format) result, which is forwarded to at least one of operand registers 114A and 114B via an early result forwarding bus, bus B 124 to serve as a data operand of dependent INSTR 2. While this stage of instruction processing is indicated as occurring at clock signal cycle RF+K−1 for INSTR 1, it is indicated as INSTR 2's initial clock signal cycle, RF. In the same clock signal cycle, INSTR 1's result is packed via pack_2N block 118 and available at the input of result register 120. In an immediately subsequent clock signal cycle (RF+K for INSTR 1), INSTR 1's result is available at the output of result register 120.

In the same clock signal cycle in which INSTR 1 completes and is applied to the result register, data operands (including the forwarded result of the execution of INSTR 1) for INSTR 2 enter the first pipeline stage of execution unit 116. From the perspective of the second, dependent instruction, this clock signal cycle is viewed as cycle RF+1 as depicted in the figure. In the same manner that INSTR 1 was executed, dependent instruction INSTR 2 traverses the pipeline of execution unit 116, arriving at the execution unit's output at clock signal cycle RF+K−1 (RF+2K−2 from the perspective of INSTR 1) and at the output of result register 120 one clock cycle later at (RF+K) as shown. As is apparent from the timing diagram of FIG. 2, utilizing an internal format early result forwarding bus (e.g., bus B 124) a dependent instruction (INSTR 2) may be issue, i.e., applied to an associated execution unit, K−1 cycles after the original instruction (INSTR 1) is issued.

FIG. 3 illustrates a timing diagram depicting early result forwarding via an interface operand format bus according to the prior art. In the timing diagram of FIG. 3, result forwarding is accomplished utilizing bus A 126 which is coupled to and accessible by multiple execution units as described previously. As in FIG. 2, FIG. 3 depicts the processing of two successive instructions, INSTR 1 and INSTR 2, where INSTR 2 depends on an execution result of INSTR 1. Similarly to the process previously described, at an initial clock cycle RF, indicated by the left-most timing interval, operands of INSTR 1 are available at an input of operand registers 114A and 114B. At an immediately subsequent clock signal cycle (RF+1) INSTR 1's operands enter a first pipeline stage of execution unit 116, executing in a pipelined fashion and subsequently completing execution at clock signal cycle RF+K−1, to generate an intermediary (i.e., internal format) result. In the same clock signal cycle this intermediary result is packed via pack_2N block 118 and available at the input of result register 120. In an immediately subsequent clock signal cycle (RF+K), the packed result is available at the output of result register 120 and forwarded to at least one of multiplexers 110A and 110B and unpack_2N blocks 112A and 112B via early result forwarding bus A 126, coinciding with the arrival and latching of dependent instruction INSTR 2 within operand registers 114A and 114B. Thus, utilizing bus A 126 to forward results in a 2N-bit wide interface format (with its associated additional packing and unpacking operations) dependent instructions (e.g., INSTR 2) forwarded using this technique issue K cycles after an associated original instruction (e.g., INSTR 1). The time period necessary between execution unit issuance of dependent instructions is known as "issue to issue" latency in processing element design.

Another technique for increasing overall instruction throughput in a processing element is vectorization or vector processing. Vector processing, such as the use of single instruction multiple data (SIMD) instructions exploit data level parallelism, performing the same operation on multiple data simultaneously. One example SIMD instruction set extension is the VMX (sometimes referred to as "Altivec") extension provided by International Business Machines Corporation of Armonk, N.Y. In some implementations, vector instructions are processed by separating a single 2N-bit wide operand into two separate N-bit operands executed utilizing a "half-pumped" execution technique whereby the operands are executed in two subsequent clock signal cycles, with the two results being concatenated following completion of the second N-bit operand or "slice" to form a complete result. Using such a half-pumped execution technique causes a vector instruction to complete in two clock signal cycles rather than the typical one clock signal cycle required for scalar instruction execution.

FIG. 4 depicts the processing element of FIG. 1 extended to support half-pumped execution of vector (SIMD) words, where the SIMD words or slices each have half the width of the full data width 2N. The illustrated processing element operates in a substantially similar manner to that depicted in FIG. 1. Data of each of two separate instruction operands is retrieved or applied from a register file (not shown) to each of two corresponding multiplexers 410A and 410B. Scalar 2N-bit wide operands so received and selected utilizing multiplexers 410A and 410B are applied to corresponding unpack_2N blocks 412a and 412b which convert the received data from interface to internal format, utilized in operand processing by execution unit 422. Once converted, internal format operands are stored in corresponding operand registers 420A and 420B as shown which, in the illustrated embodiment, are implemented as multiplexer (MUX) latches as described herein. A corresponding pack_2N block 424 converts the scalar execution result data from internal to 2N-bit wide interface format. Scalar results generated by execution unit 422 may then be distributed across N-bit result registers 428A and 428B from which a concatenated result, upon selection utilizing a global result multiplexer 430, may be reapplied to the register file as instruction processing completes and/or applied to the operand registers of the same or another processing element as shown. Result forwarding may be implemented via either of bus B 432 (in internal format) or bus A 434 (in interface format) as previously described with respect to FIG. 1.

Vector instructions are handled by the processing element of FIG. 4 utilizing a half-pumped execution technique as will now be described. As each operand associated with a vector (e.g., SIMD) instruction is received at multiplexers 410A and 410B, it is applied to additional 2N-bit to N-bit selection multiplexers 414A and 414B as well as temporary registers 416A and 416B rather than to unpack_2N blocks 412A and 412B. Multiplexers 414A and 414B are utilized to select which portion or "slice" of the vector instruction will be processed first. In the embodiment of FIG. 4, a big-endian architecture is presumed and the most-significant or "high order" operand slices represented by bits O . . . N−1 of each operand are processed first and applied to unpack N blocks 418A and 418B which convert the received data from a N-bit wide bit external or "interface" format into an internal format. After the first vector operand slice is processed as described, each 2N-bit side interface formatted operand is applied, from corresponding temporary registers 416A and 416B, via associated multiplexers 410A and 410B back to the inputs of multiplexers 414A and 414B. At the second application of each operand however, multiplexers 414A and 414B are utilized to select the least significant or "low order" operand slices represented by bits N . . . 2N−1 for unpacking and operand register storage.

Using the described half-pumped execution technique, vector slices are then applied to execution unit 422 for execution. Execution results produced by execution unit 422 are then packed using pack_N block 426 in consecutive clock cycles. Consequently, the higher order half of each result (e.g. result [0:N−1]) is available at the output of result register 428A in clock signal cycle K. The other (lower order) half (e.g. result[N:2N−1]) is available at the output of the other result register 428B in cycle K+1. The complete 2N-bit wide result of the instruction concatenated from the two separate result registers and is available via global results multiplexer 430 on bus A 434 in cycle K+1. The progression of data vector instruction operands through the processing element of FIG.

4, including the use of result forwarding buses 432 and 434 may be better appreciated when read in conjunction with the description of FIGS. 5 and 6.

FIG. 5 illustrates a timing diagram depicting early result forwarding of vector instruction slice results via an internal format bus according to the prior art. Different SIMD slices per instruction are depicted using different shading patterns. In the embodiment of FIG. 5, a striped pattern block represents a high order SIMD slice [0:N−1] and a crossed pattern block represents a low order SIMD slice [N:2N−1]. More specifically, FIG. 5 illustrates vector instruction execution with an issue-to-issue latency interval of K+1 cycles, where the result of the first instruction INSTR 1 is sent in an external interface register file format via bus A 434 to be utilized in the execution of a dependent second instruction, INSTR 2. FIG. 6 illustrates a timing diagram depicting early result forwarding of vector instruction slice results via an interface format bus according to the prior art. Per the timing diagram shown, the data path of FIG. 4 supports an issue-to-issue interval of K−1 cycles using bus B in two subsequent cycles to forward internal format result slices at the conclusion of half-pumped execution.

Modern processing element designs however must also support an issue-to-issue interval of K cycles if the smallest issue-to-issue-latency is K−1 cycles to avoid increased instruction sequencer complexity. Interface format bus A 434 of FIG. 4 is only available in a clock signal cycle when a generated result is sent to an associated register file and therefore cannot be used in consecutive clock cycles to achieve K-cycle issue-to-issue latency. Conventional processing elements may therefore either elect to provide for K+1 cycle issue-to-issue latency alone or include an additional result forwarding bus dedicated for supporting K-cycle latency with the former solution suffering from reduced performance and the latter solution adding complexity and power consumption to a design if the requisite wiring resources and physical real estate are available.

SUMMARY

Embodiments of the present invention for reducing issue-to-issue latency by reversing processing order in half-pumped single instruction multiple data (SIMD) execution units are described herein.

According to one embodiment, a processor functional unit is provided which comprises a frontend unit coupled to a register file, the register file in turn comprising a plurality of registers to store one or more operands associated with first and second vector instructions, where execution of the second vector instruction depends on an execution result of the first vector instruction. The described processor functional unit further comprises an execution core unit coupled to the frontend unit, the execution core comprising a pipelined execution unit to execute instructions including the first and second vector instructions. A backend unit of the processor functional unit is coupled to the execution core unit and comprises a result register to store the execution result. An execution order control signal unit is utilized in the described embodiment to generate a forwarding order control signal in dependence on the parity of a clock signal applied to the processor functional unit. The described processor functional unit further includes first and second interconnects. The first interconnect is coupled between an output and an input of the execution core unit to selectively forward at least one of first and second portions of the execution result of the first vector instruction based on the forwarding order control signal. The second interconnect, by contrast, is coupled in the described embodiment between an output of the backend unit and an input of the frontend unit to selectively forward at least one of first and second portions of the execution result of the first vector instruction based on the forwarding order control signal.

BRIEF DESCRIPTION OF THE DRAWINGS

The present embodiments may be better understood, and numerous features and advantages made apparent to those skilled in the art by referencing the accompanying drawings wherein like reference characters are used to indicate separate but similar or identical elements and further wherein.

DESCRIPTION OF EMBODIMENT(S)

Figure 1:
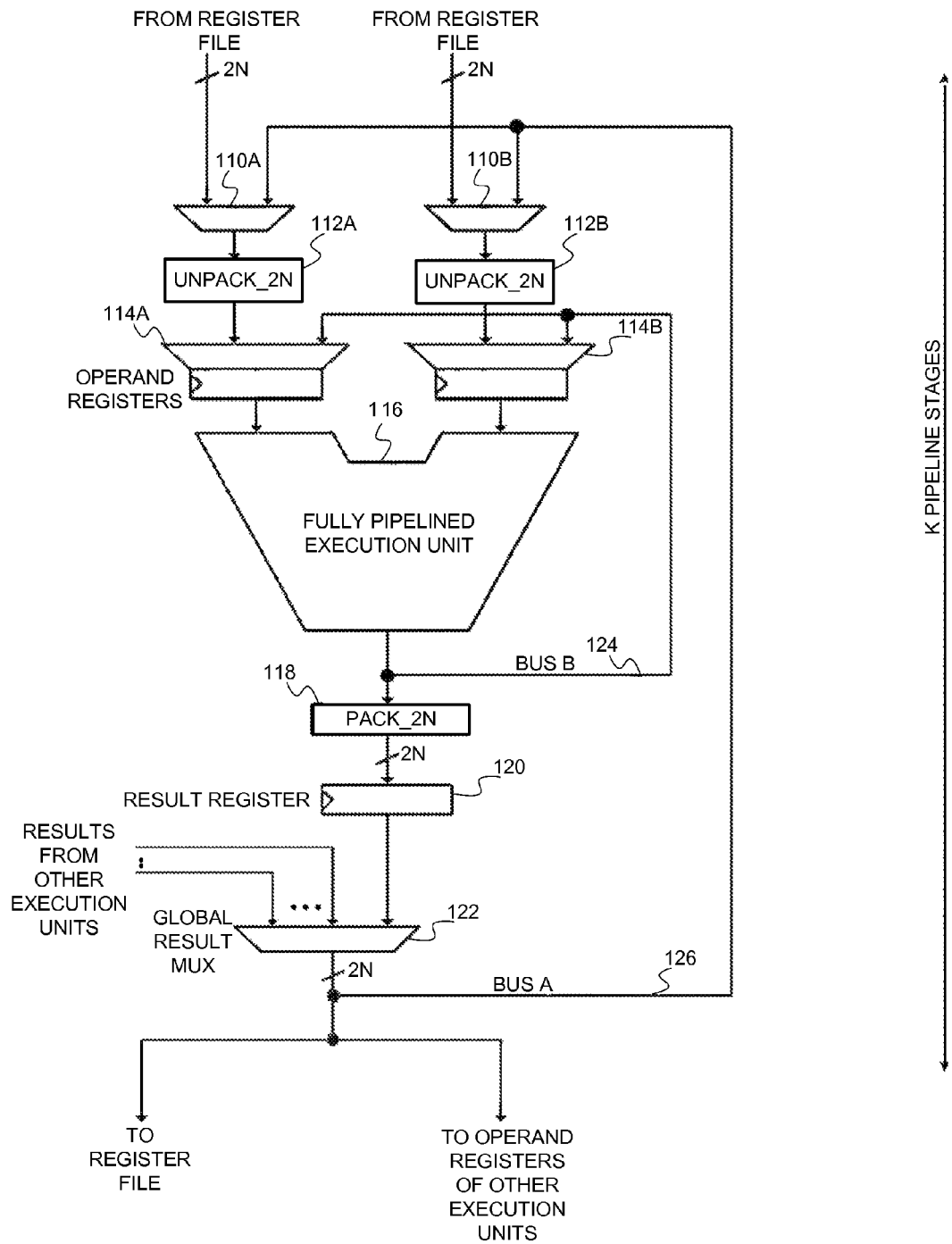
FIG. 1 illustrates a processing element including early result forwarding according to the prior art.
Figure 2:
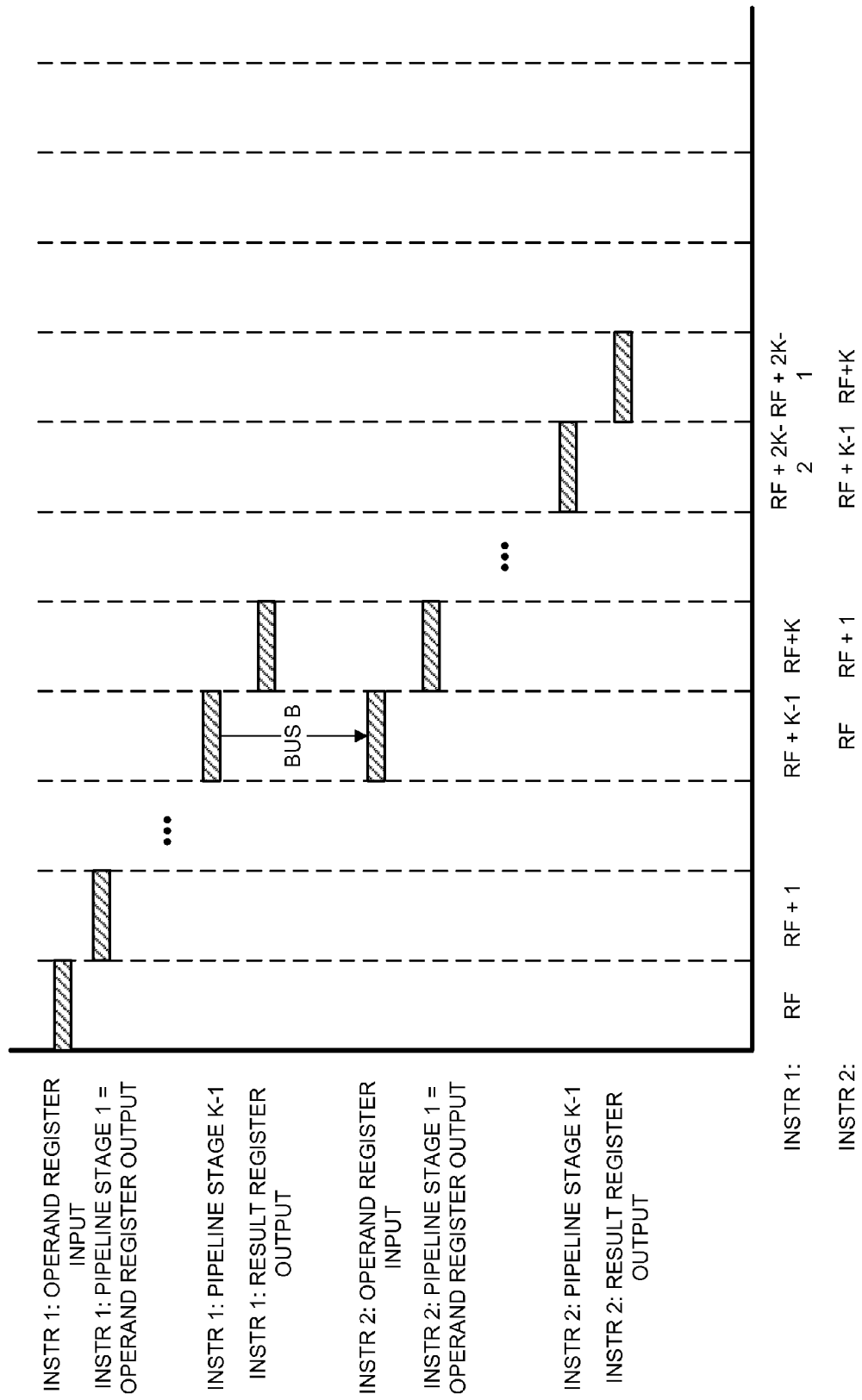
FIG. 2 illustrates a timing diagram depicting early result forwarding via an internal operand format bus according to the prior art.
Figure 3:
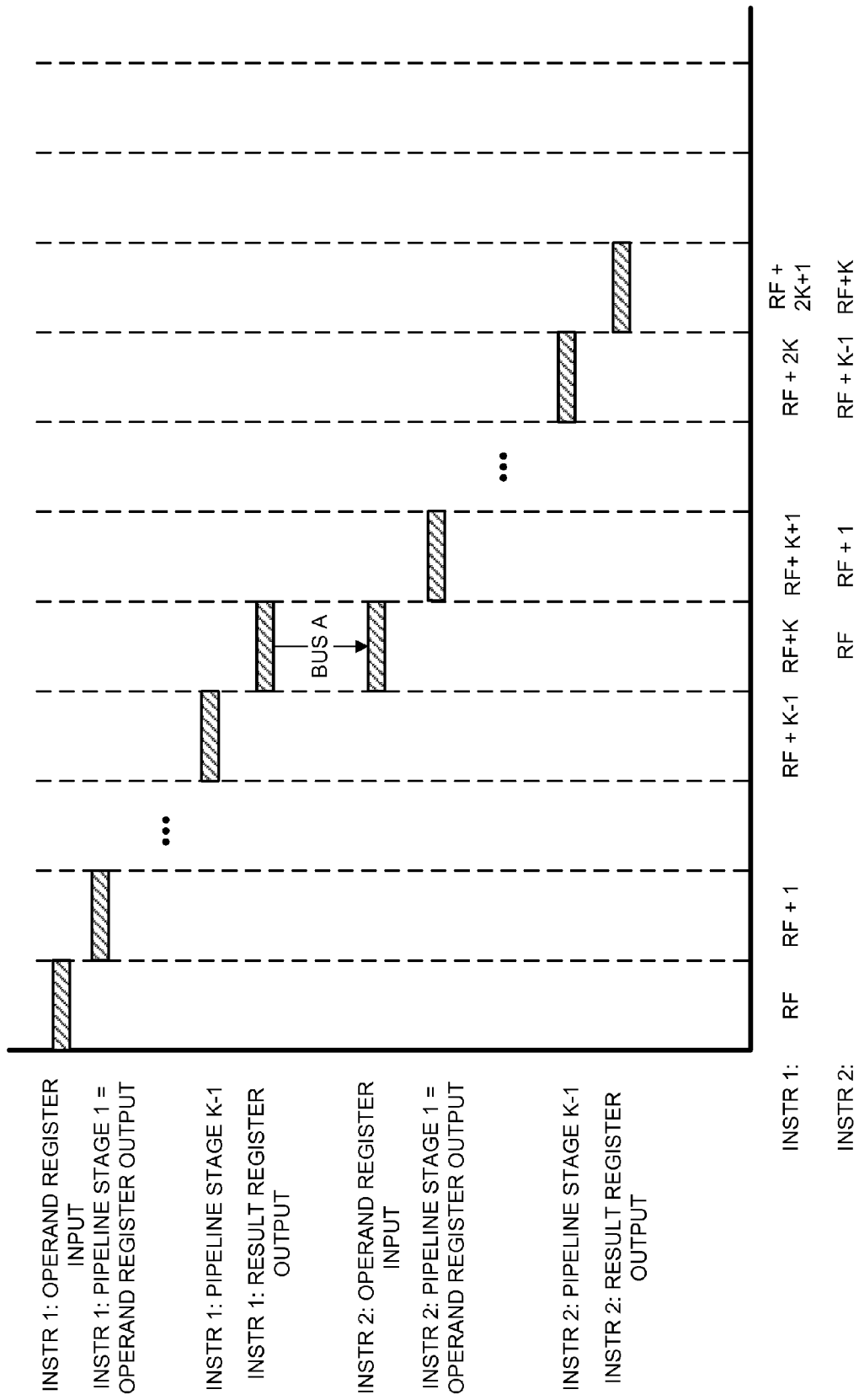
FIG. 3 illustrates a timing diagram depicting early result forwarding via an interface operand format bus according to the prior art.
Figure 4:
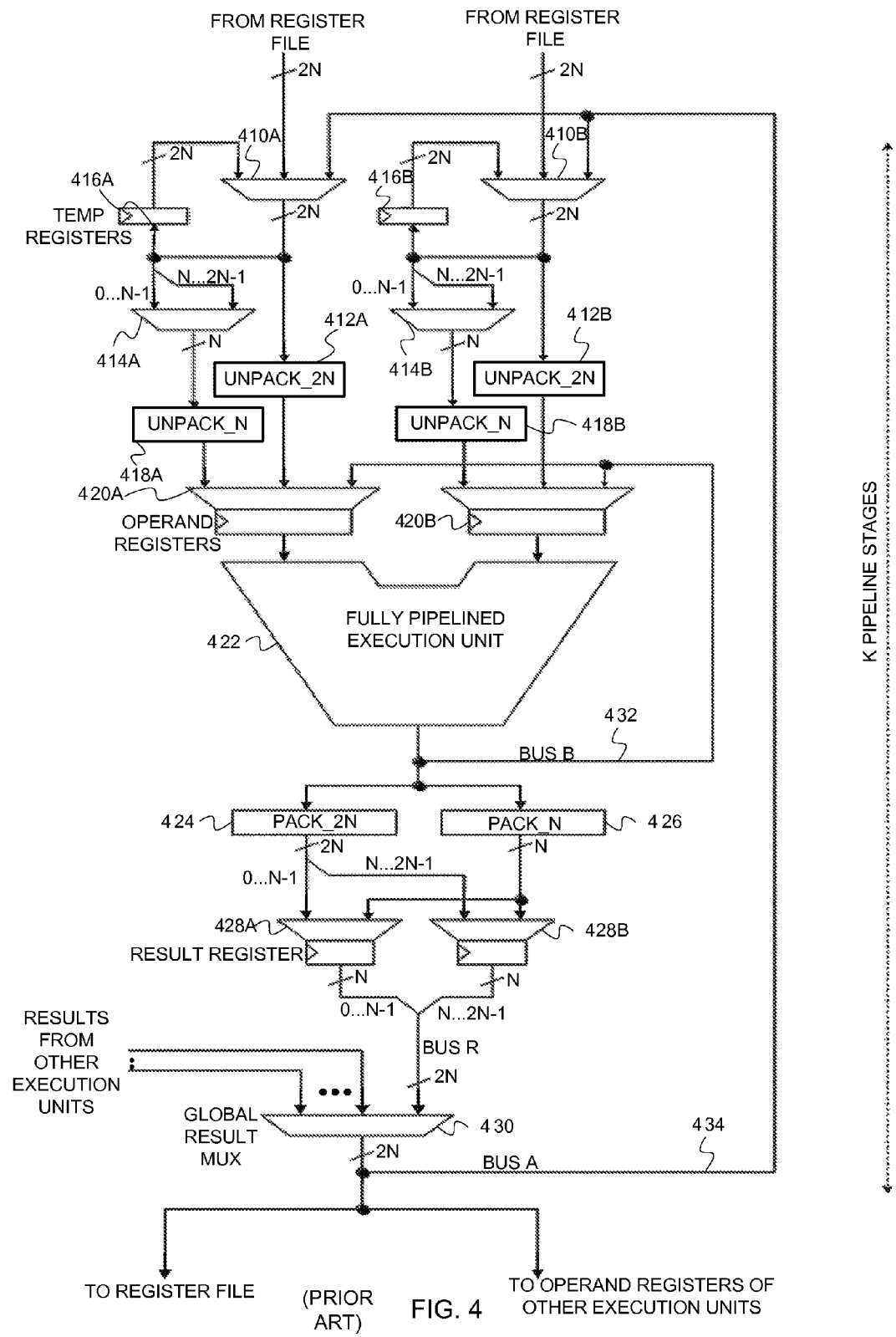
FIG. 4 depicts the processing element of FIG. 1 extended to support half-pumped execution of vector (SIMD) words, where the SIMD words or slices each have half the width of the full data width 2N according to the prior art.
Figure 5:
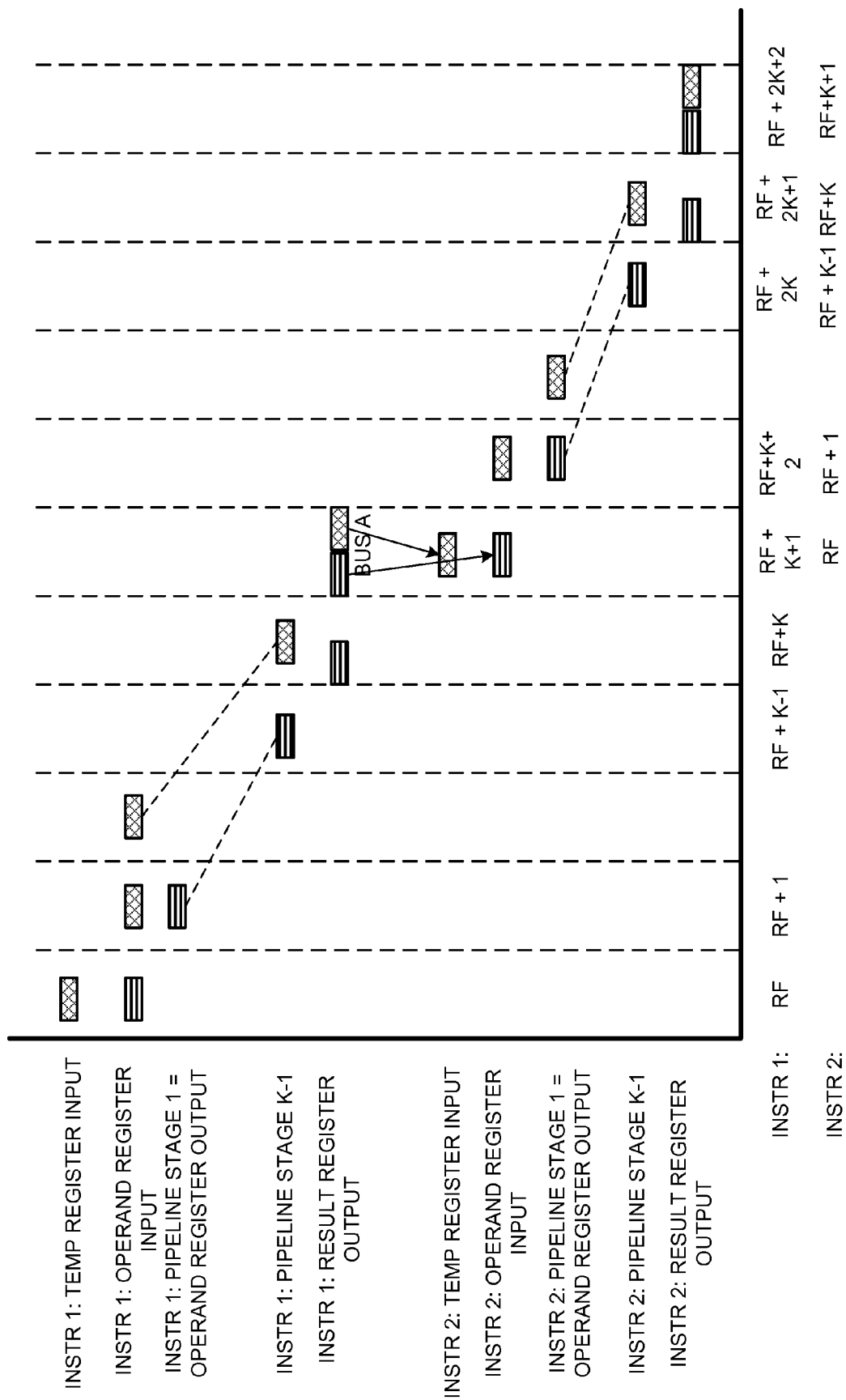
FIG. 5 illustrates a timing diagram depicting early result forwarding of vector instruction slice results via an internal format bus according to the prior art.

In the following detailed description, numerous details are set forth in order to provide a thorough understanding of the present claimed subject matter. However, it will be understood by those skilled in the art that the claimed subject matter may be practiced without these specific details. For example, whiles portions of various processing elements or processor functional units have been depicted herein as utilizing operand "packing" and "unpacking" logic, in alternative implementations such operand format-related elements may be unnecessary and consequently eliminated. In such alternative embodiments, the particular arrangement and operation of, inter alia, the various interconnects or buses shown may be varied to facilitate or improve operation of the overall processing elements or systems. Similarly, while portions of various processing elements or processor functional units have been depicted as coupled to other execution units (e.g., via a global result multiplexer) embodiments of the present invention may operate even if utilized in the context of a system having a single execution unit or additional but separate execution units. In other instances, well-known methods, procedures, components, and circuits have not been described in detail so as to not obscure the claimed subject matter.

Various operations may be described as multiple discrete operations in turn, in a manner that may be helpful in understanding embodiments of the claimed subject matter; however, the order of description should not be construed to imply that these operations are order dependent. The description may use the phrases "in an embodiment," or "in embodiments," which may each refer to one or more of the same or different embodiments. Furthermore, the terms "comprising," "including," "having," and the like, as used with respect to embodiments of the claimed subject matter, are synonymous.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Embodiments of the present invention support both K−1 and K issue-to-issue latency in a processing element having K total pipeline stages without the addition of a separate result forwarding bus utilized solely to resolve interface format forwarding bus conflicts by dynamically reversing the processing order of the vector (e.g., SIMD) instruction operand slices. Consequently issue-to-issue-latency for half-pumped instructions does not exceed that for fully pipelined instructions executed on the same processing element, improving performance of half-pumped instruction execution without increasing instruction sequence complexity.

Figure 7:
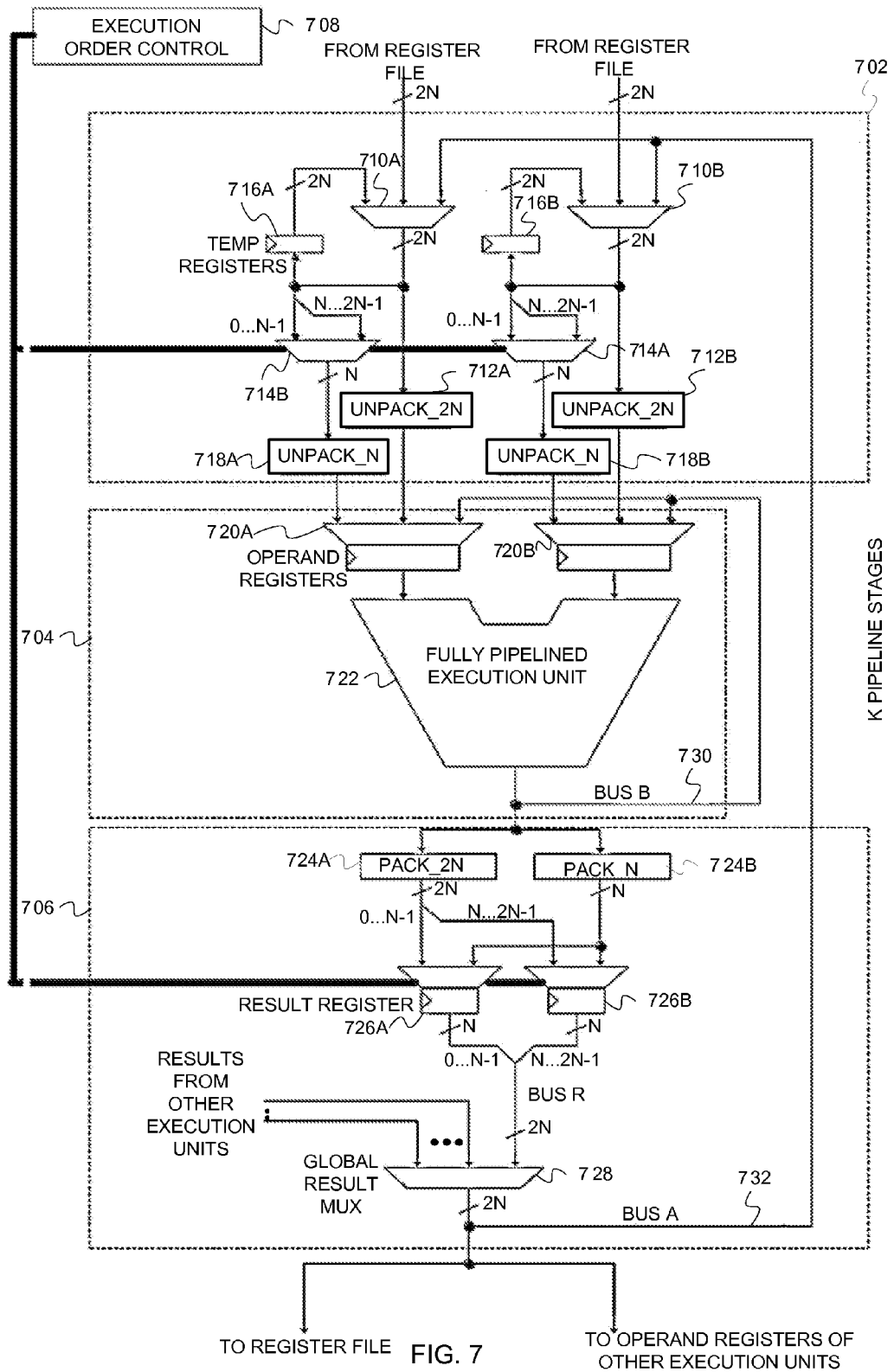
FIG. 7 illustrates a processing element supporting K−1 and greater issue-to-issue latency for dependent vector instructions per an embodiment of the present invention.

FIG. 7 illustrates a processing element supporting K−1 and greater issue-to-issue latency for dependent vector instructions per an embodiment of the present invention. In the present description and accompanying drawing figures and views, for the sake of simplicity, only two operands are drawn for each processing element. In alternative embodiments processing or functional units with any number of operands, for example floating point units configured to perform fused multiply-add instructions with three operands are contemplated. Likewise, the number of possible sources per operand register shown has been given merely as an example and may differ in alternative implementations.

The processing element of FIG. 7 includes a frontend unit 702, an execution core unit 704, a backend unit 706 and an execution order control unit 708 coupled together as shown. The described units have been provided as an aid representing functional groupings of logical elements of a processor for purposes of the present description. It will be appreciated that in various alternative embodiments of the present invention such units may be modified as to the logical elements they include, modified in their arrangement, or eliminated. In one embodiment the illustrated processing element may be provided as a monolithic integrated circuit or as part of a unified "system on a chip" package such that the indicated units may be indistinguishable from one another by physical observation.

In the processing element of FIG. 7, frontend unit 702 is coupled to a shared register file (not shown) utilized to store data operands for use in the execution of instructions. Operand data associated with two dependent vector instruction is retrieved or applied from the register file to each of two corresponding multiplexers 710A and 710B. In the embodiment of FIG. 7, the illustrated processing element is capable of processing operands and generating results having a data width of 2N where N is a positive integer value. Scalar or otherwise fully pipelined instructions are provided, via multiplexers 710A and 710B, to corresponding unpack_2N blocks 712a and 712b which convert the received data from a 2N-bit wide bit external or "interface" format into an internal format, utilized in operand processing by an associated execution unit such as execution unit 722.

Once converted, internal format operands are stored in corresponding operand registers 720A and 720B within execution core unit 704 as shown which, in the illustrated embodiment, are implemented as multiplexer (MUX) latches. Corresponding pack_2N blocks 724A and 724B converts the scalar execution result data from internal to 2N-bit wide interface format. Note that the position of the unpack and pack blocks may differ from implementation to implementation, and may be even dispensable for some execution units (e.g. if the execution unit can process data in the interface format directly). Scalar results generated by execution unit 722 may then be distributed across N-bit result registers 726A and 726B from which a concatenated result, upon selection utilizing a global result multiplexer 728, may be reapplied to the register file as instruction processing completes and/or applied to the operand registers of the same or another processing element as shown.

Vector (e.g., SIMD) instructions are processed in the depicted processing element via a "half-pumped" instruction execution technique where the SIMD words or slices processed each have half the width of the full data width 2N. As each operand associated with a vector (e.g., SIMD) instruction is received at multiplexers 710A and 710B, it is applied to both an additional 2N-bit to N-bit selection multiplexers 714A and 714B as well as temporary register 716A and 716B rather than to unpack_2N blocks 712A and 712B. Multiplexers 714A and 714B are utilized to select which portion or "slice" of the vector instruction will be processed first. In the embodiment of FIG. 7, a big-endian architecture is presumed and the vector/SIMD instruction operand slice execution and result forwarding order are dynamically modified as will be described. Upon selection, a SIMD operand slice is applied to unpack_N blocks 718A and 718B which convert the received data from a N-bit wide bit external or "interface" format into an internal format. After the first vector operand slice is processed as described, each 2N-bit side interface formatted operand is applied, from corresponding temporary registers 716A and 716B, via associated multiplexers 710A and 710B back to the inputs of multiplexers 714A and 714B. At the second application of each operand however, multiplexers 714A and 714B are utilized to select the previously unselected operand slices for unpacking and operand register storage.

Using the described half-pumped execution technique, vector slices are then applied to execution unit 722 for execution. Execution results produced by execution unit 722 are then packed using pack_N blocks 726A and 726B in consecutive clock cycles. Consequently, one half of each result is available at a result register in clock signal cycle K and the other half of the vector instruction execution is available in the result register in cycle K+1. Early result forwarding is provided according to one or more embodiments of the present invention utilizing both an internal format interconnect or "bus" (bus B 730) and an external "interface" format interconnect (bus 732). It should be noted that bus B 730 as depicted in FIG. 7 is private to execution unit 722, whereas bus A 732 is shared among a plurality of execution units having access to a common register file. Consequently, bus A 732 may carry each execution result only in the cycle where the result is sent to the register file and cannot be guaranteed to select bus R via global result multiplexer 728 in other cycles.

In the embodiment of FIG. 7, execution order control unit 708 provides a forwarding order control signal depicted via darkened lines coupled to each of multiplexers 714 and result registers 726A and 726B generated in dependence on the parity of a clock signal (not shown) applied to the processing element at the time an instruction, upon which a subsequent instruction depends, is received at operand registers 720A and 720B. The generation and utilization of such a forwarding order control signal according to one embodiment of the present invention will be described in greater detail with respect to FIGS. 8 and 9.

Figure 8:
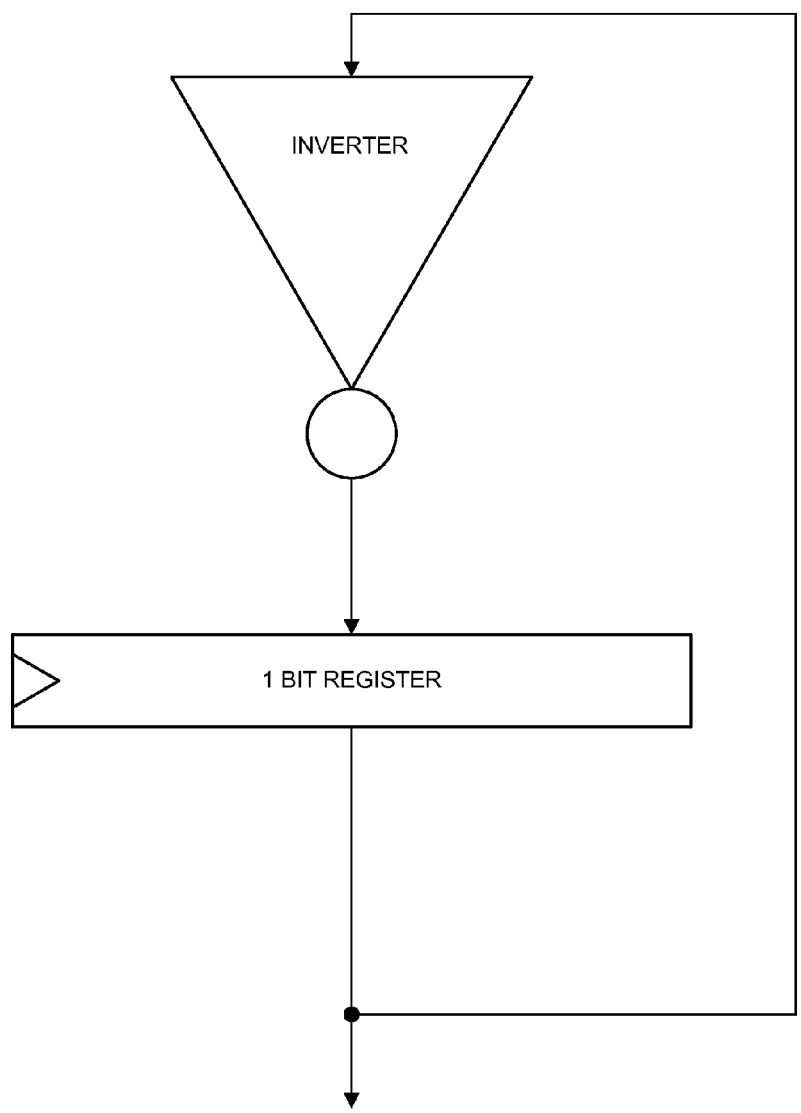
FIG. 8 illustrates an execution order control signal unit according to an embodiment of the present invention.

FIG. 8 illustrates an execution order control signal unit according to an embodiment of the present invention. More specifically, the depicted execution order control signal unit of FIG. 8 comprises a single bit binary counter including an inverter and a single bit register to indicate an applied clock signal parity. The output of the counter controls the half-pumped SIMD processing order of the execution unit via control of multiplexers 714A and 714B and result registers 726A and 726B. Utilizing the depicted execution order control signal unit, an output control signal is generated which is positive for all odd clock signal cycles and zero for all even clock signal cycles. It will be appreciated that the terms "odd" and "even" used herein are relative. In alternative embodiments of the present invention, an output control signal may be generated which is positive for all even clock signal cycles and zero for all odd clock signal cycles. In yet another alternative embodiment of the present invention, the least significant bit output of a synchronous counter or decrementing counter is utilized rather than the execution order control signal unit depicted in FIG. 8 to generate an output control signal as described.

Figure 6:
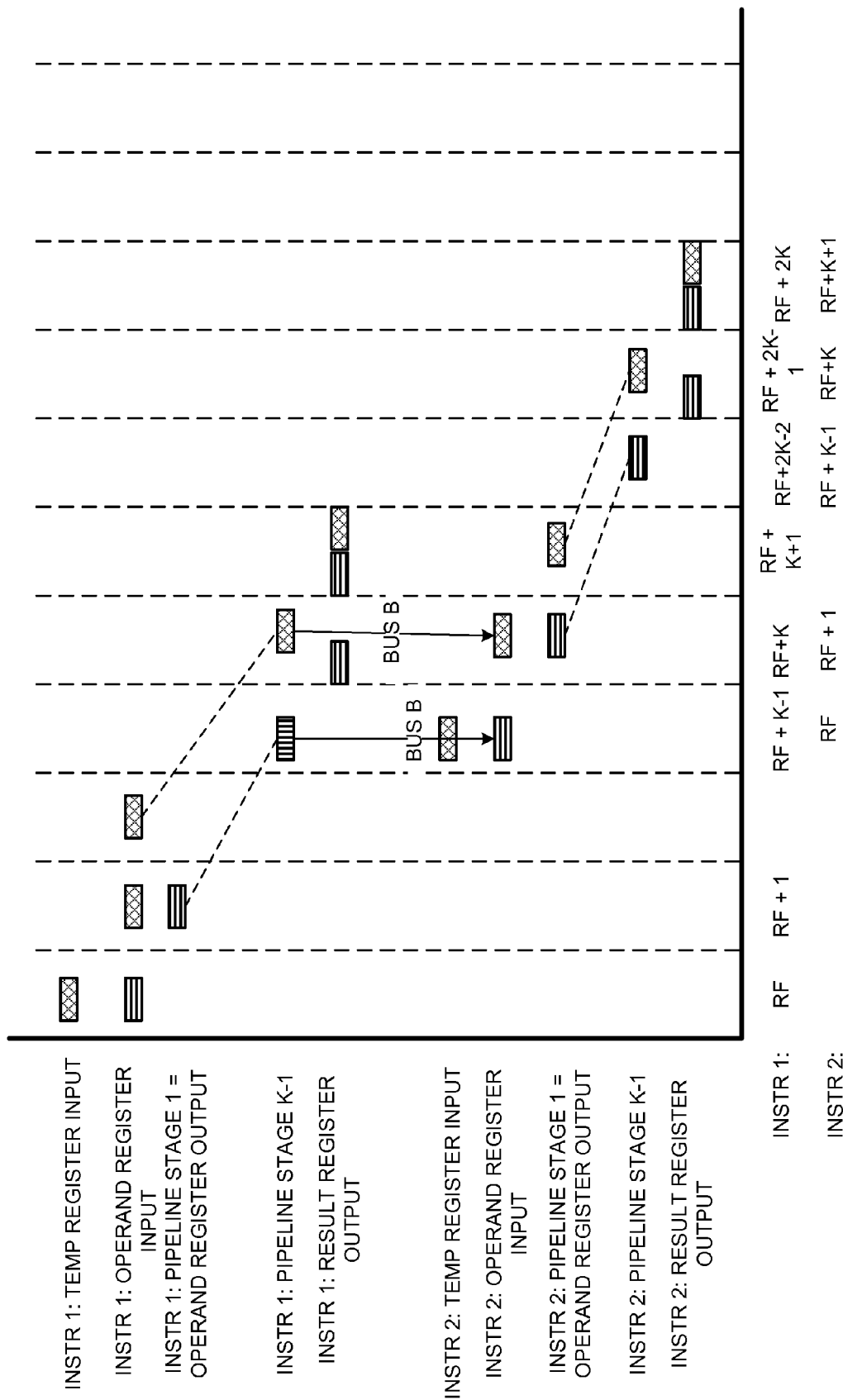
FIG. 6 illustrates a timing diagram depicting early result forwarding of vector instruction slice results via an interface format bus according to the prior art.
Figure 9:
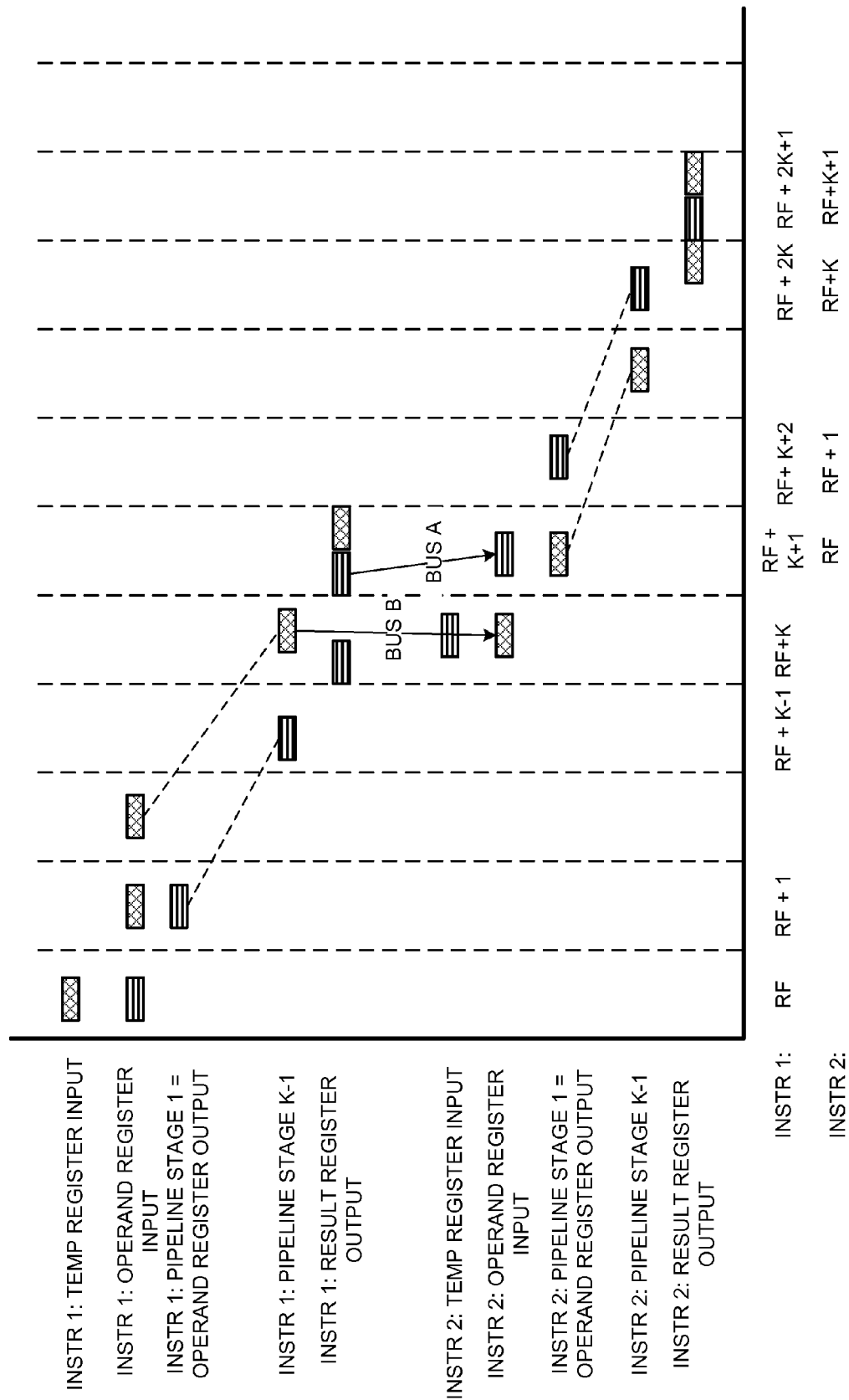
FIG. 9 illustrates a timing diagram depicting early result forwarding providing K-cycle issue-to-issue latency for dependent vector instructions according to and embodiment of the present invention.

FIG. 9 illustrates a timing diagram depicting early result forwarding providing K-cycle issue-to-issue latency for dependent vector instructions according to and embodiment of the present invention. In the timing diagram of FIG. 9, a processing element clock cycle at which operands of a given instruction are available at inputs of operand registers 720A and 720B is referred to as cycle "RF". Based on the overall pipeline depth and the number of logic levels of an associated processing element, a processing result is available on bus R, denoting an output of result registers 726A and 726B, K cycles after RF, where K is a positive integer value representing the number of pipeline stages of the processing element as a whole. The timing diagram of FIG. 9 depicts the processing of two successive instructions, INSTR 1 and INSTR 2, where the INSTR 2 instruction depends on an execution result of INSTR 1. Different SIMD slices per instruction are depicted using different shading patterns. A striped pattern block represents a high order SIMD slice [0:N−1] and a crossed pattern block represents a low order SIMD slice [N:2N−1]. Utilizing one or more embodiments of the present invention, FIG. 9 illustrates vector instruction execution with an issue-to-issue latency interval of K cycles, where the SIMD slice execution results of the first instruction INSTR 1 are sent either in an internal format in their original execution order via bus B 730 in consecutive cycles where INSTR 1 was received in an even clock signal cycle or in both internal and external/interface format in the reverse order of their original execution via both bus B 730 and bus A 732. The former case is implemented just as indicated with respect to the description of FIG. 6, the latter is illustrated and described in FIG. 9 as shown.

At an initial clock cycle RF, indicated by the left-most timing interval, a high order SIMD operand slice of INSTR 1 is available at operand registers 720A and 720B and a low order SIMD operand slice of INSTR 1 is stored in temporary registers 716A and 716B. At an immediately subsequent clock signal cycle (RF+1) INSTR 1's high order SIMD operand slice enters pipe stage 1 and the low order SIMD operand slice is applied to operand registers 720A and 720B. The SIMD slices of INSTR 1 executes in a half-pumped pipelined fashion and complete execution at clock cycles RF+K−1 and RF+K, respectively. In the depicted embodiment of FIG. 9, bus B 730 is utilized to forward low order SIMD operand slice out of its execution order in clock cycle RF+K allowing a dependent instruction, INSTR 2 to being K cycles after issuance of INSTR 1. In an immediately subsequent clock signal cycle (RF+K+1 for INSTR 1) INSTR 1's complete result (including both high order and low order SIMD slice operand results) arrives at result registers 726A and 726B and may be concatenated and forwarded, via bus 732 to multiplexers 710A and 710B. In this manner, the high order SIMD operand slice can be forwarded, out of its normal execution order utilizing the interface format bus A 732.

Figure 10:
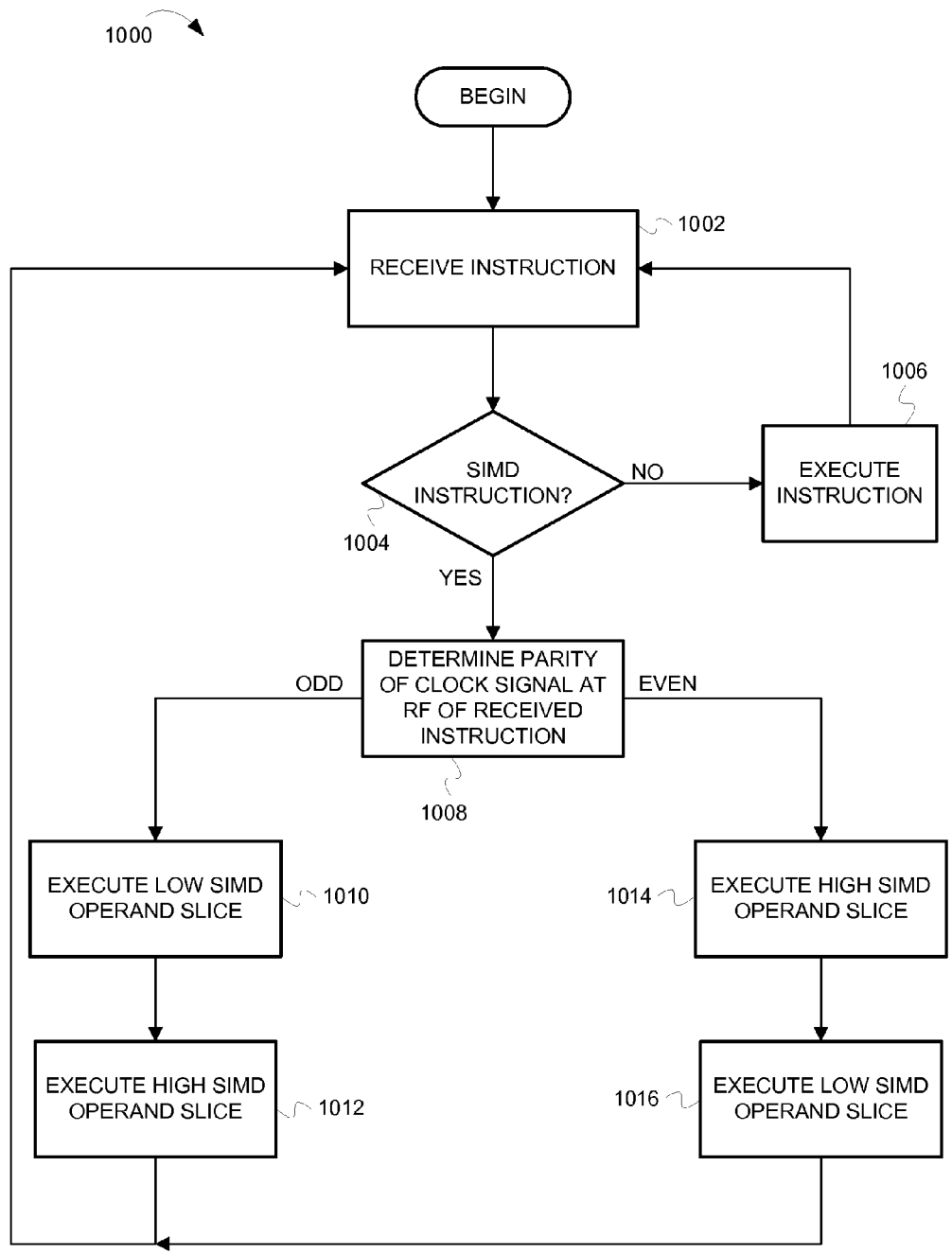
FIG. 10 illustrates a method of achieving K-cycle issue-to-issue latency for dependent vector instructions with early result forwarding according to an embodiment of the present invention.

FIG. 10 illustrates a method of achieving K-cycle issue-to-issue latency for dependent vector instructions with early result forwarding according to an embodiment of the present invention. The illustrated method embodiment 1000 begins with the reception of an instruction to be executed (process block 1002) e.g., at a processing element from an associated register file. A determination is then made whether the received instruction is a vector or "SIMD" operation (process block 1004). In one embodiment an instruction set associated with the processing element may include a group or set of vector or SIMD "extensions" which may be identified by one or more attributes of an associated instruction opcode (e.g., a the setting of a particular bit). For non-vector or scalar instructions normal instruction execution is performed (process block 1006) and the process returns to receive additional instructions (process block 1002).

Upon determination that a vector instruction has been received, a determination is made whether the parity of a clock signal received at the "RF" stage (at which the instruction is or will be received at one or more operand registers for application to an execution unit) is "odd" or "even" (process block 1008). For instructions received in odd clock signal cycles, a low vector or SIMD slice operand is executed (process block 1010) followed the execution of the high vector or SIMD slice operand (process block 1012). By contrast, for instructions received during even clock signal cycles, the high SIMD slice (process block 1014) is executed before the low SIMD slice (process block 1016). In an alternative embodiment, clock cycle parity associated with the execution order of high and low vector or SIMD slice operands is reversed (i.e., for instructions received in odd clock signal cycles, a high vector or SIMD slice operand is executed followed the execution of the low vector or SIMD slice operand). Following half-pumped execution of the vector/SIMD instruction, the depicted process loops as more instructions are received as shown.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
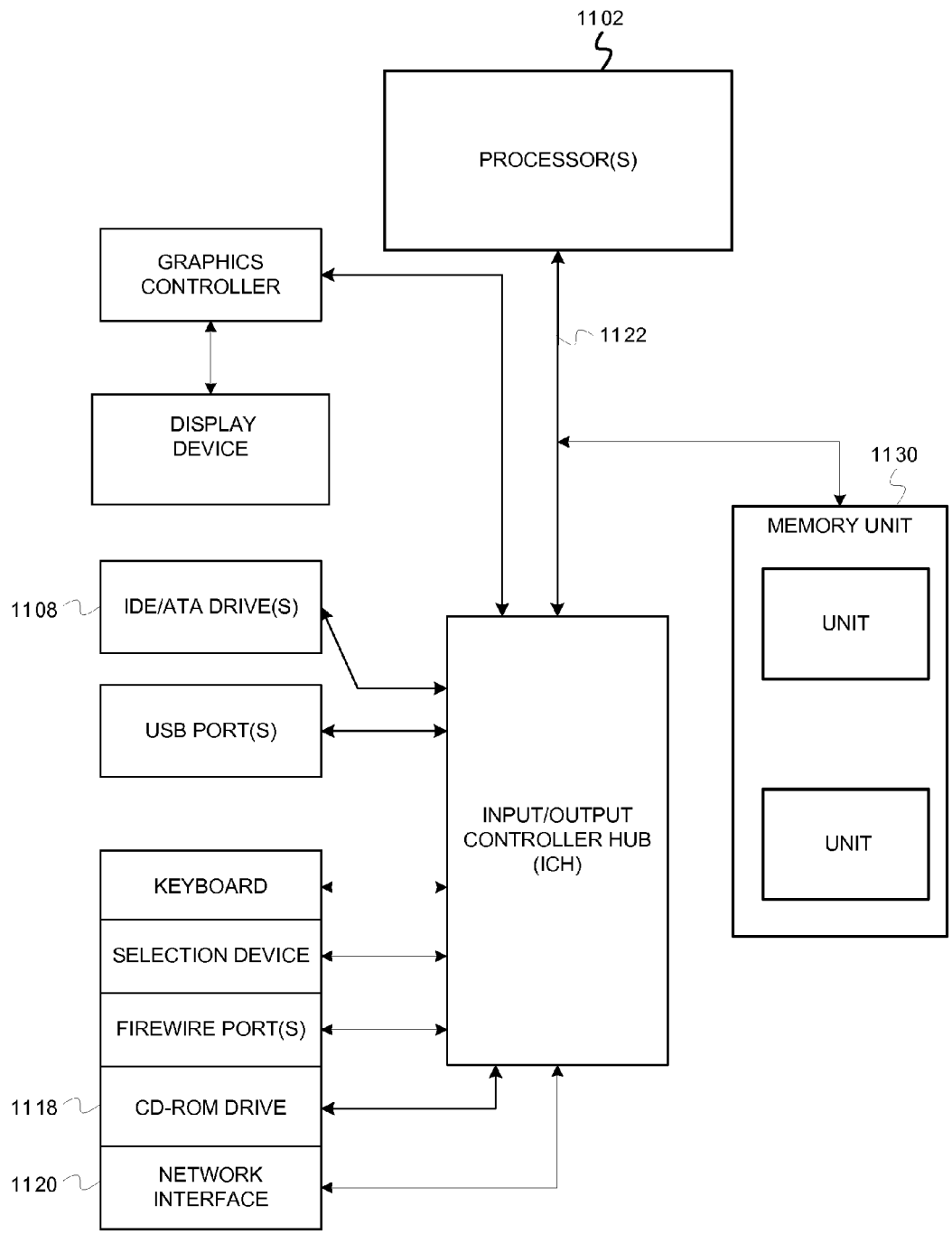
FIG. 11 depicts an example data processing system useable with one or more embodiments of the present invention.

FIG. 11 depicts an example data processing system useable with one or more embodiments of the present invention. A computer system includes a processor unit 1102 (including one or more processing elements, processors, processor cores, nodes, and/or implementing multi-threading, etc.). The computer system includes memory unit 1130. Memory unit 1130 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1122 (e.g., PCI, ISA, PCI-Express, HyperTransport®, Infini-Band®, NuBus, etc.), a network interface 1120 (e.g., an ATM interface, an Ethernet interface, a Frame Relay interface, SONET interface, wireless interface, etc.), and a storage device(s) (e.g., optical storage 1118, magnetic storage 1108, etc.). Memory unit 1130 embodies functionality to implement embodiments described above. Any one of these functionalities may be partially (or entirely) implemented in hardware and/or on the processing unit 1102. For example, the functionality may be implemented with an application specific integrated circuit, in logic implemented in the processing unit 1102, in a co-processor on a peripheral device or card, etc. Further, realizations may include fewer or additional components not illustrated in FIG. 11 (e.g., video cards, audio cards, additional network interfaces, peripheral devices, etc.). Processor unit 1102, storage device(s) 1118 and 1108, and network interface 1120 are coupled to bus 1122. Although illustrated as being coupled to bus 1122, memory unit 1130 may be coupled directly to processor unit 1102.

While the embodiments are described with reference to various implementations and exploitations, it will be understood that these embodiments are illustrative and that the scope of the inventive subject matter is not limited to them. In general, techniques for reducing issue-to-issue latency in the execution of dependent vector (e.g., SIMD) instructions. as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A processor functional unit comprising:
   a frontend unit coupled to a register file, said register file comprising a plurality of registers to store one or more operands associated with a first vector instruction and a second vector instruction, wherein execution of said second vector instruction depends on an execution result of said first vector instruction;
   an execution core unit coupled to said frontend unit, said execution core unit comprising a pipelined execution unit to execute instructions including said first vector instruction and said second vector instruction;
   a backend unit coupled to said execution core unit, said backend unit comprising a result register to store said execution result;
   an execution order control signal unit to generate a forwarding order control signal in dependence on a parity of a clock signal applied to said processor functional unit, wherein said execution order control signal unit is coupled to a signal selection unit to
   forward a first portion of said execution result to said execution core unit prior to forwarding a second portion of said execution result in response to a determination that said parity of said clock signal, upon a receipt of said first vector instruction at said execution core unit, is even, and
   forward said second portion of said execution result to said execution core unit prior to forwarding said first portion of said execution result in response to a determination that said parity of said clock signal, upon the receipt of said first vector instruction at said execution core unit, is odd;
   a first interconnect coupled between an output of said execution core unit and an input of said execution core unit to selectively forward at least one of said first portion of said execution result and said second portion of said execution result to said input of said execution core unit based on said forwarding order control signal; and
   a second interconnect coupled between an output of said backend unit and an input of said frontend unit to selectively forward at least one of said first portion of said execution result and said second portion of said execution result to said input of said frontend unit based on said forwarding order control signal.

2. The processor functional unit of claim 1, wherein
   said instructions including said first vector instruction and said second vector instruction further comprise a scalar instruction,
   said processor functional unit has a minimum issue-to-issue latency of K−1 cycles, wherein K is the number of pipeline stages greater than 1, and
   said first vector instruction and said second vector instruction have an issue-to-issue latency of K cycles.

3. The processor functional unit of claim 1, wherein said second interconnect is further coupled to at least one other execution core unit.

4. The processor functional unit of claim 1, wherein said execution order control signal unit comprises a single-bit binary counter.

5. The processor functional unit of claim 1, wherein
   said first vector instruction comprises a single instruction multiple data (SIMD) instruction, and
   said pipelined execution unit comprises a SIMD instruction mode to execute said SIMD instruction utilizing a half-pumped instruction execution technique.

6. A data handling system comprising:
   a memory unit;
   a bus coupled to said memory unit; and
   a processor functional unit coupled to said bus, said processor functional unit comprising:
      a frontend unit coupled to a register file, said register file comprising a plurality of registers to store one or more operands associated with a first vector instruction and a second vector instruction, wherein execution of said second vector instruction depends on an execution result of said first vector instruction;
      an execution core unit coupled to said frontend unit, said execution core unit comprising a pipelined execution unit to execute instructions including said first vector instruction and said second vector instruction;
      a backend unit coupled to said execution core unit, said backend unit comprising a result register to store said execution result;
      an execution order control signal unit to generate a forwarding order control signal in dependence on a parity of a clock signal applied to said processor functional unit, wherein said execution order control signal unit is coupled to a signal selection unit to:
         forward a first portion of said execution result to said execution core unit prior to forwarding a second portion of said execution result in response to a determination that said parity of said clock signal, upon a receipt of said first vector instruction at said execution core unit, is even; and
         forward said second portion of said execution result to said execution core unit prior to forwarding said first portion of said execution result in response to a determination that said parity of said clock signal, upon the receipt of said first vector instruction at said execution core unit, is odd;
      a first interconnect coupled between an output of said execution core unit and an input of said execution core unit to selectively forward at least one of said first portion of said execution result and said second portion of said execution result to said input of said execution core unit based on said forwarding order control signal; and a second interconnect coupled between an output of said backend unit and an input of said frontend unit to selectively forward at least one of said first portion of said execution result and said second portion of said execution result to said input of said frontend unit based on said forwarding order control signal.

7. The data handling system of claim 6, wherein said instructions including said first vector instruction and said second vector instruction further comprise a scalar instruction, said processor functional unit has a minimum issue-to-issue latency of K−1 cycles, wherein K is the number of pipeline stages greater than 1, and said first vector instruction and said second vector instruction have an issue-to-issue latency of K cycles.

8. The data handling system of claim 6, wherein said second interconnect is further coupled to at least one other execution core unit.

9. The data handling system of claim 6, wherein said execution order control signal unit comprises a single-bit binary counter.

10. The data handling system of claim 6, wherein said first vector instruction comprises a single instruction multiple data (SIMD) instruction, and said pipelined execution unit comprises a SIMD instruction mode to execute said SIMD instruction utilizing a half-pumped instruction execution technique.

* * * * *